July 3, 1956
M. M. PARKER
2,752,837
FOUR ROW CULTIVATOR
Filed July 6, 1953
4 Sheets-Sheet 1
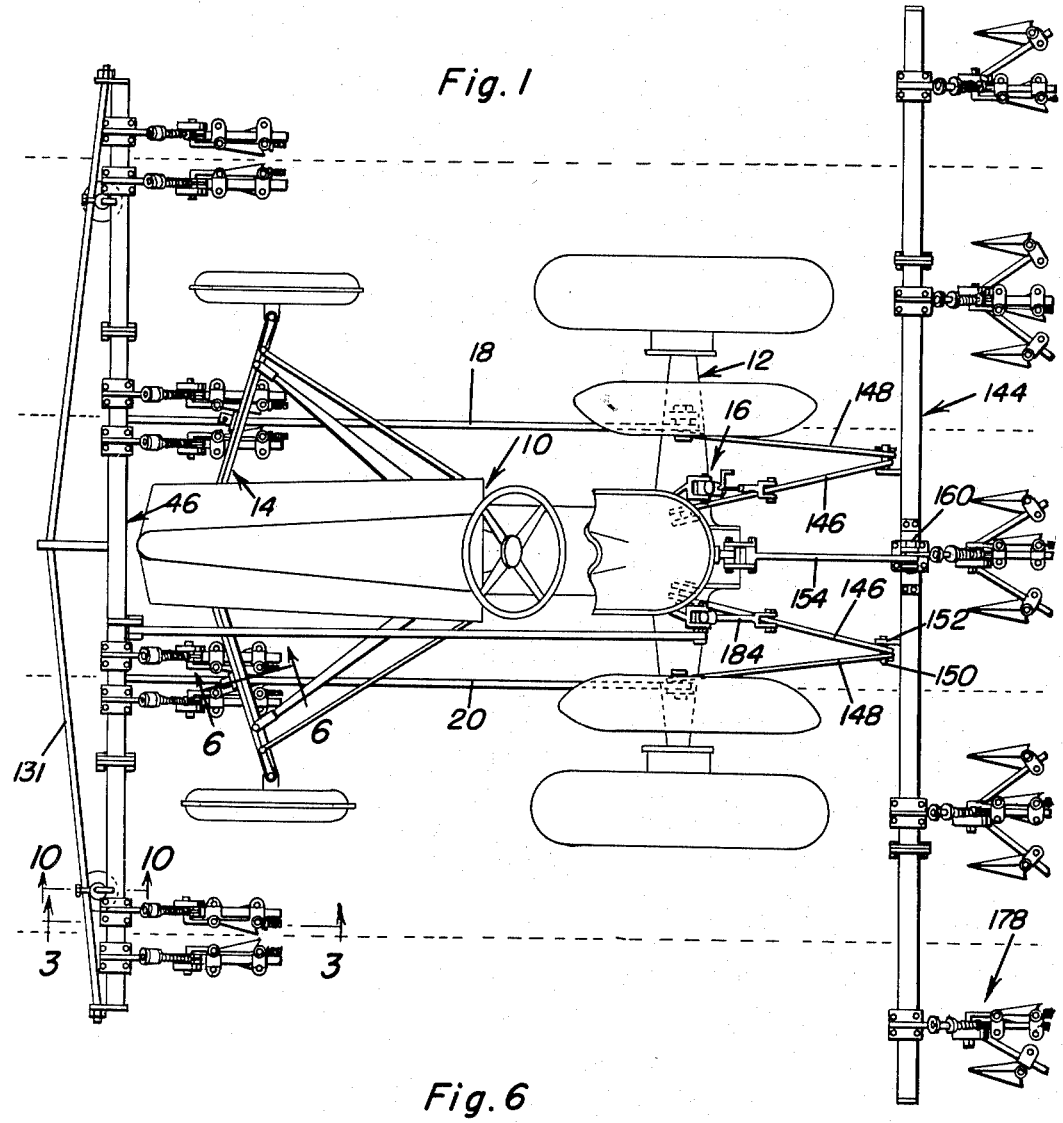
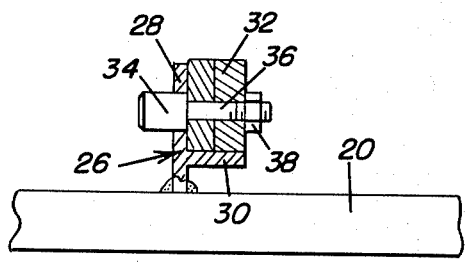
Marvin M. Parker
INVENTOR.
BY July 3, 1956 M. M. PARKER 2,752,837
FOUR ROW CULTIVATOR
Filed July 6, 1953 4 Sheets-Sheet 2
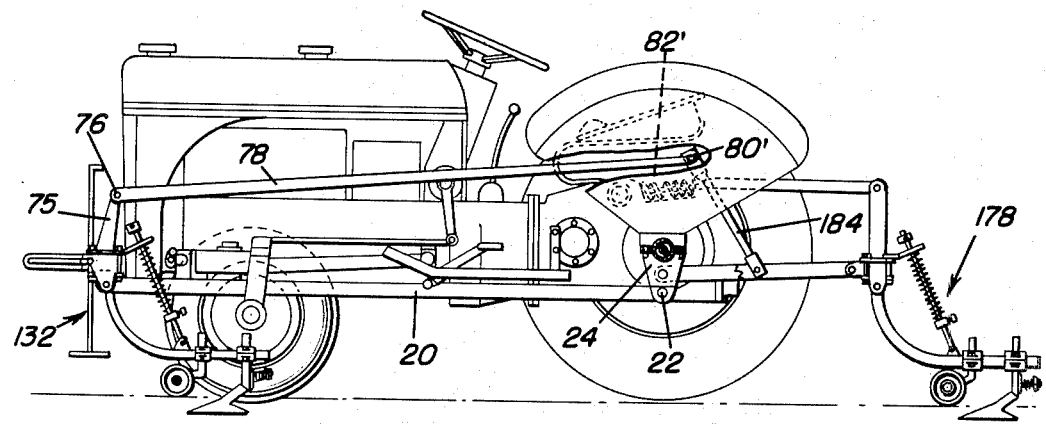
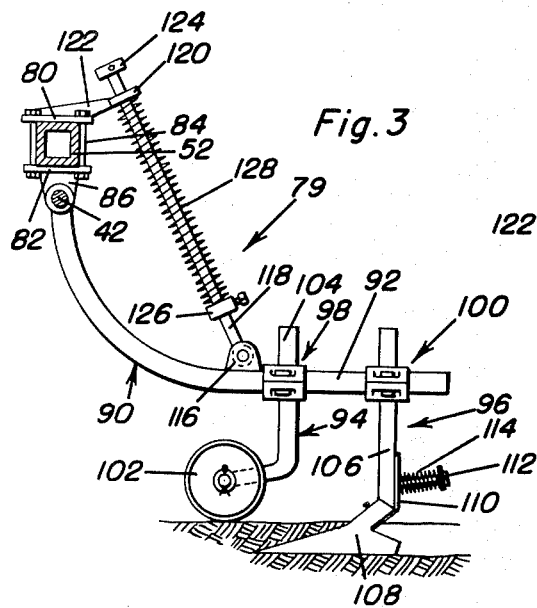
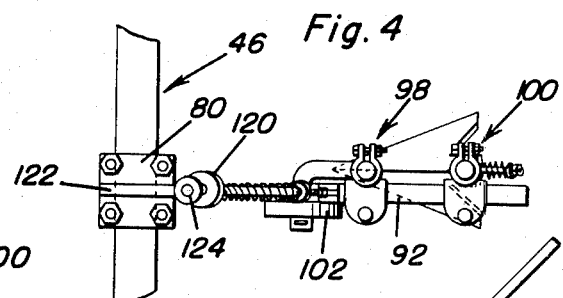
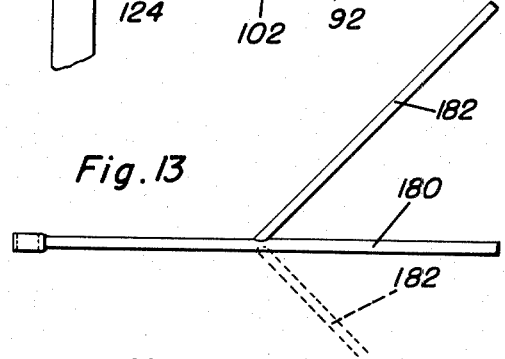
Marvin M. Parker
INVENTOR.

July 3, 1956  M. M. PARKER  2,752,837
FOUR ROW CULTIVATOR
Filed July 6, 1953  4 Sheets-Sheet 3
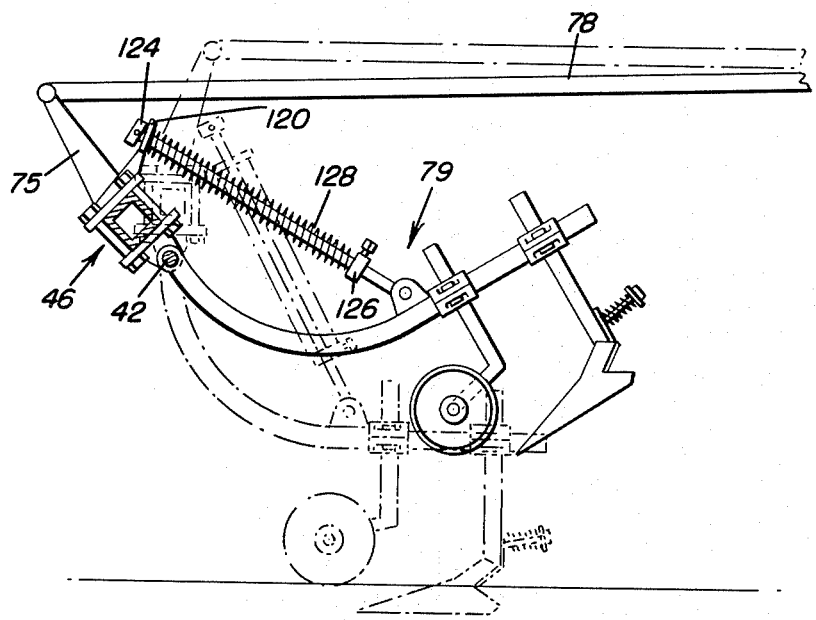
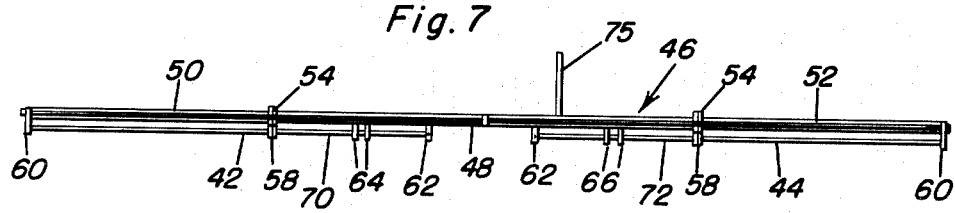
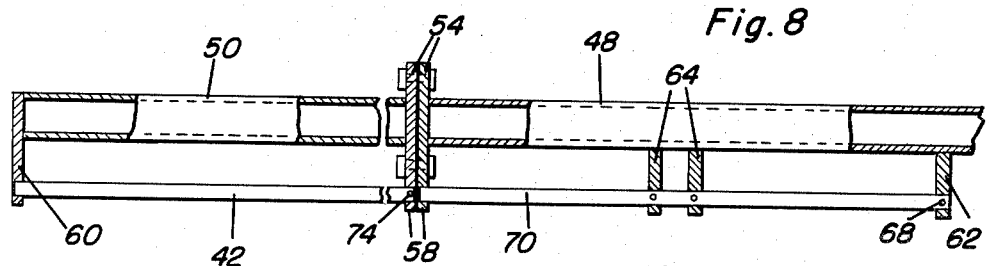
Marvin M. Parker
INVENTOR.
BY *Thomas A. O'Brien*
*and Harvey B. Jackson*
Attorneys July 3, 1956  M. M. PARKER  2,752,837
FOUR ROW CULTIVATOR
Filed July 6, 1953  4 Sheets-Sheet 4
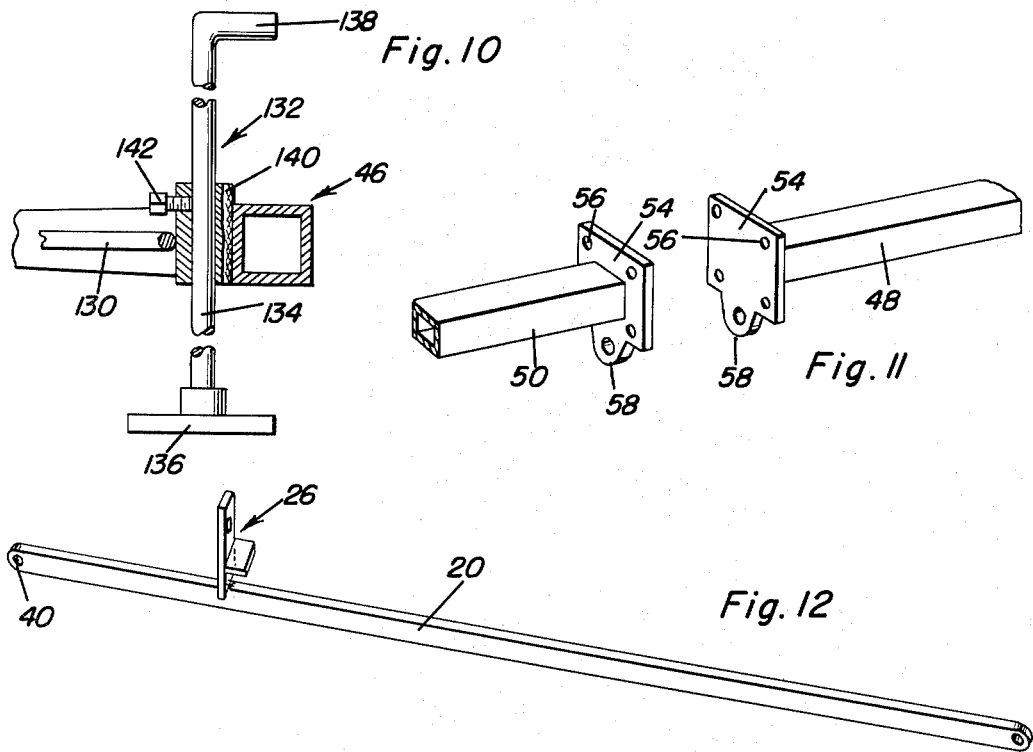
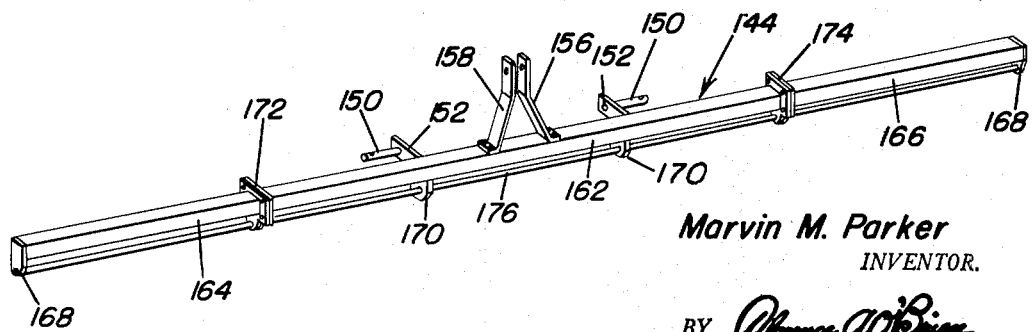
Marvin M. Parker
INVENTOR.

United States Patent Office 2,752,837
Patented July 3, 1956

2,752,837
FOUR ROW CULTIVATOR

Marvin M. Parker, Hayti, Mo., assignor to G. A. Kelly Plow Company, Longview, Tex.

Application July 6, 1953, Serial No. 366,120

2 Claims. (Cl. 97—47.31)

This invention relates generally to agricultural implements and pertains more particularly to an improved form of cultivator assembly.

A primary object of this invention is to provide a light weight and compact cultivator assembly for use particularly with Ford or Ferguson tractors but which may be utilized in conjunction with any tractor having power operated lifting arms.

Another object of this invention is to provide an improved form of cultivator assembly incorporating cultivator units at the rear and front of a tractor so as to evenly distribute the weight and working forces thereon, at no time imparting unbalancing forces to the tractor.

Another object of this invention is to provide an improved form of cultivator assembly which may be readily attached and detached from an associated tractor.

Another object of this invention is to provide an improved form of cultivator assembly for tractors wherein a plurality of rows may be simultaneously cultivated in an advantageous manner.

Another object of this invention is to provide front and rear cultivating units connected to the power lift of an associated tractor in such a manner as to be simultaneously actuated for lifting motion toward and away from the ground surface.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of a tractor having the improved cultivator assembly attached thereon and showing the assembly in position for use;

Figure 2 is a side elevation of the assembly shown in Figure 1;

Figure 3 is an enlarged vertical section taken substantially along the plane of section line 3—3 of Figure 1;

Figure 4 is a plan view of the assembly shown in Figure 3;

Figure 5 is a vertical section similar to Figure 3 but showing an individual cultivator unit in the lifting position in full lines and in the operative position in dotted lines;

Figure 6 is a vertical section taken substantially along the plane of section line 6—6 of Figure 1, showing the draft arm to axle connection on an enlarged scale;

Figure 7 is an elevational view of the forward tool bar;

Figure 8 is an enlarged view partly in section of the tool bar assembly shown in Figure 7;

Figure 9 is a perspective view of the rear tool bar assembly;

Figure 10 is an enlarged vertical section taken substantially along the plane of section line 10—10 of Figure 1 and showing details of the support feet;

Figure 11 is a perspective view of a portion of the tool bar;

Figure 12 is a perspective view of one of the draft bars; and

Figure 13 is a plan view of one of the rear cultivator assemblies.

Referring now more particularly to Figure 1, reference numeral 10 indicates generally the Ford or Ferguson type tractor which includes the usual body portion, the rear axle assembly 12, the front axle assembly 14, the power operated lift arm assembly 16 and the usual ground engaging wheels. Although the assembly is herein shown and described as particularly adapted for use with Ford or Ferguson tractors, it will be readily understood that the assembly can also be adapted for use with other tractors.

With reference now also to Figure 2, it will be seen that a pair of draft bars 18 and 20, are secured at their rearward ends by means of pivot pins 22 to brackets 24 depending from the rear axle assembly and that these draft bars extend forwardly of the tractor structure. As seen in Figure 6, a bracket 26 is secured to an intermediate portion of each of the draft bars and includes the upright portion 28 and horizontal legs 30 which form an abutment shelf in engagement with the front axle beam 32. The vertical portion of the bracket is apertured to receive the enlarged headed end 34 of a securing member whose reduced shank portion 36 extends through the axle beam and terminates in a threaded portion engaged by the locking nut 38 to firmly secure each of the draft bars in conjunction with the rear pivot pins 22, to the tractor.

The forward end of each of the draft bars is apertured as at 40, see Figure 12, and these apertures pivotally receive one or the other of the pivot rods 70 and 72 which form a part of the front tool bar assembly 46.

Referring now more particularly to Figures 7 and 8, it will be seen that the front tool bar assembly includes the center member 48 and the end members 50 and 52, all of rectangular, tubular construction to provide a maximum of rigidity with a minimum of weight. As seen in Figure 11, adjacent ends of these various sections are provided with coupling plates 54 of generally rectangular configuration with apertures 56 at each corner thereof and including the depending apertured boss member 58 through which the pivot rods 42 and 44 are adapted to be received. Opposite ends of the tool bar assembly are provided with depending apertured guide brackets 60 and similar guide brackets 62 are provided in spaced relation on the intermediate portion of the center member 48 to support the inner ends of the respective rods. Also, additional guide brackets are arranged in closely spaced pairs 64 and 66 adjacent the opposite ends of the intermediate section 48 and it is between these pairs of guide brackets that the free ends of the draft bars are received, the inner ends of the pivot rods being apertured as at 68 to register with corresponding apertures in the guide brackets 62 for receiving a lock pin for preventing longitudinal displacement of the inner pivot rod members 70 and 72, as will be apparent. The outer pivot rods 42 and 44 are also apertured, as at 74 for pinning in a similar manner.

A lever arm 75 is secured in upstanding relation to the member 48 and the free end of this arm is pivoted by the pin 76 to one end of the drag link 78 whose other end is pinned, as at 80' to the lift arm 82' of one of the power lift assemblies 16.

Referring now more particularly to Figures 3–5, it will be seen that the various cultivator units 79 are secured to the associated tool bar by means of upper and lower clamping plates 80 and 82 respectively which are joined in clamping relation by the fasteners 84 and it will be further seen that the lower clamping plates 82 include depending ears 86 apertured to receive a corresponding pivot rod. Cultivator beams 90 are pivotally received at their upper ends on one of the pivot rods and these beams are curved in the manner shown to present a trailing horizontal portion 92 to which a gage wheel 94 and cultivator sweep assemblies 96 are adjustably secured by the brackets 98 and 100 respectively. A gage wheel 102 supports an associated beam in proper relation to the ground and the axle support shank 104 of these gage wheel assemblies are vertically adjustable in the brackets 98, the brackets being longitudinally adjustable on the portion 92 of the beam. The cultivator sweeps 96 include the vertical support bars 106 which are vertically and longitudinally adjustable with respect to the beam portion 92 through the medium of the brackets 100 and the cultivator shoes 108 are resiliently connected to the support members 106 through the medium of the heel plates 110 whose vertical portions are slotted to receive the bolt 112 whereby the springs 114 normally urge the shoes into the position shown in Figure 3, although the springs 114 will allow a resilient connection therebetween for permitting the cultivator shoes to flex with respect to the support members 106 should any individual shoe strike an obstruction under ground.

Each beam is provided with a bracket ear 116 which receives pivotally one end of the support rods 118, the other ends of these rods passing through the apertured boss portions 120 of brackets 122 secured to the upper clamping plates 80. The upper ends of the rods 118 are provided with the stop collars 124 and adjacent the lower ends thereof are provided with tension collars 126 and the coil springs 128 are telescopically received on the members 118 between the tension collars and the bracket bosses 120 so as to normally urge the cultivator beams toward the ground assuring proper penetration of the cultivator shoes thereby. This also gives an individual knee-action to each cultivator unit. As seen in Figure 5, when the link 78 is advanced by means of the lift arm 82', to the full line position shown, the arm 75 will impart a rotative motion to the tool bar assembly 46 through the various pivot rods 42, 44, 70 and 72. At this time, the stop collars 124 will engage the associated bosses 120 to pick each individual associated cultivator unit upwardly away from the ground to the full line position shown from the dotted line position.

It will be noted that each individual cultivator unit may be individually slid along the associated tool bar by merely loosening the various clamping elements 84 to allow the individual cultivator units to be adjusted to the width between adjacent rows of cultivation, which rows are indicated generally by the dotted lines in Figure 1. It will be noted that the forward cultivator assembly, above described, is adapted to cultivate closely adjacent either side of an associated row.

The usual stabilizer link 131 is provided on the front space of the tool bar 46. Adjacent each end of the tool bar are provided supporting feet assemblies 132 to support the cultivator assembly when it is detached from the tractor. Referring more particularly to Figure 10, it will be seen that the supporting assembly 132 includes the vertical leg 134 whose lower end is provided with the foot plate 136 and whose upper end is laterally bent, as at 138, to provide a handle grip, the main portion 134 being slidably received through the sleeve 140 rigidly secured to the tool bar assembly and provided with set screws 142 for maintaining the proper adjusted height of the supporting foot assemblies, as will be readily apparent.

A rear tool bar assembly 144 is provided behind the rear wheels of the tractor and is pivotally secured thereto through the medium of the idler and stabilizing links 146 and 148 respectively. These links are disposed in convergent relation and are received on the pivot pin 150 extending laterally from the associated bracket ears 152 on the rear tool bar assembly. A further stabilizing link 154 is pivotally secured to both the tractor and the tool bar assembly, the tool bar assembly connection including the spaced yoke legs 156 and 158 whose upper ends are apertured to receive a pivot bolt 160 which extends through the rearward free end of the link 154.

The rear tool bar assembly includes a center portion 162 and the opposite end portions 164 and 166, all of which are interconnected in a manner similar to the front bar assembly and this rear assembly includes depending guide brackets 168 and 170 as well as guide brackets on the coupling plates 172 and 174 to receive the single pivot rod 176 therethrough. This pivot rod provides a pivotal support for the various rear cultivator units 178, the clamping plate assemblies of these various units being similar in construction to the front units. However, the individual rear unit differs from the front unit inasmuch as they include not only the gage wheels and cultivator sweeps on the beams 180, but are also provided with either one or two divergent beam shanks 182 according to their manner of location, as will be readily apparent from a study of Figure 1. In this respect, it is to be noted that the end cultivator unit include only two cultivator shoe members while all the intermediate units include three such members and it will be noted that these units are all positioned on the rear tool bar assembly 144 in such manner as to cultivate substantially mid-way between adjacent rows of the crop whereby, in conjunction with the front cultivator assembly, a most efficient and complete cultivation of the soil will result. Also, the weight of the entire assembly is evenly distributed between the front and rear of the tractor and any forces arising as a result of the cultivating process will tend to be evenly distributed throughout the frame of the tractor so as not to unbalance the same in any manner whatsoever.

Lift links 184 extend from each of the lift arm assemblies and are connected to the idler link members 146 so that when the front tool bar assembly is pivoted in a direction to lift the cultivator unit away from the ground, the rear cultivator units will also be moved away from the ground.

When it is desired to convert the assembly into a two row cultivator, it is merely necessary to remove the opposite end of the front and rear tool bar assemblies so that only the intermedite cultivator unit will be used, that is the three center units in the rear assembly and the two center units in the front assembly. In this respect, it might be preferable to provide the rear pivot rod 176 with three sections, two end sections for the sections 164 and 166 and an intermediate portion for the section 162.

It will be appreciated that the compact and light weight construction of the cultivator assembly, above described, will permit a single person to easily manipulate the same into position for attachment to the tractor and detach the same when desired. In this respect, it will be noted that the removable inner pivot rod members, as provided on the front tool bar assemblies, allow for a maximum ease of assembling and disassembling this forward unit, as it is merely necessary to pull the two inner pivot rods to effect disengagement between the draft arms and the tool bar.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. In a cultivator assembly for tractors, a tool bar, said tool bar including an elongated supporting member provided with a plurality of longitudinally spaced, depending apertured ears; a pivot rod disposed in spaced parallel relation to said supporting member and removably carried by said ears, a pair of draft bars having end portions received between pairs of said ears and pivotally carried by said pivot rod, a pair of spaced clamp plates engageable on opposite side portions of the tool bar permitting longitudinal adjustment of the clamp plates relative to the tool bar, a cultivator beam having an upper vertically disposed end portion pivotally connected to one of said clamp plates, the lower end of the cultivator beam being disposed horizontally in trailing relationship to the tool bar, spring urged shock absorbing means operatively connected between the tool bar and the lower end portion of the cultivator beam for resisting upward movement thereof, a gauge wheel adjustably secured on the lower end of the cultivator beam and including a support shank having means thereon permitting vertical and longitudinal adjustment of said gauge wheel on the cultivator beam, and a cultivator sweep assembly adjustably secured on the cultivator beam in trailing relationship to the gauge wheel, said cultivator sweep assembly including a vertical support bar having means thereon permitting vertical and longitudinal adjustment of the cultivator sweep assembly relative to the cultivator beam and gauge assembly, the cultivator sweep assembly including a cultivator shoe portion resiliently engaged with the support bar permitting rearward movement of the shoe portion upon striking an obstruction.

2. The assembly as defined in claim 1, and coupling plates rigidly attached to opposite ends of said supporting member for attaching extensions thereto.

References Cited in the file of this patent

UNITED STATES PATENTS

| | | |
|---|---|---|
| 1,544,094 | Krebs | June 30, 1925 |
| 1,598,196 | Hickman | Aug. 31, 1926 |
| 1,755,806 | Benjamin | Apr. 22, 1930 |
| 1,936,749 | Cady et al. | Nov. 28, 1933 |
| 1,946,402 | Johnson | Feb. 6, 1934 |
| 2,005,618 | Graham | June 18, 1935 |
| 2,046,466 | Kolterman | July 7, 1936 |
| 2,171,830 | Hayes | Sept. 5, 1939 |
| 2,200,777 | Lindgren | May 14, 1940 |
| 2,259,864 | Smith | Oct. 21, 1941 |
| 2,324,867 | Mott et al. | July 20, 1943 |